United States Patent [19]

Nailon

[11] Patent Number: 4,708,243

[45] Date of Patent: Nov. 24, 1987

[54] PORTABLE BAG STORAGE ASSEMBLY

[76] Inventor: Wayne M. Nailon, 3020 N. Nesbitt, Oklahoma City, Okla. 73107

[21] Appl. No.: 860,050

[22] Filed: May 6, 1986

[51] Int. Cl.[4] .................. B65D 30/00; B65D 33/02; B65D 33/14; B65D 33/16

[52] U.S. Cl. .............................. 206/315.11; 150/111; 150/113; 206/554; 383/37; 383/121

[58] Field of Search .................. 383/37, 121, 22, 24, 383/25; 206/554, 315.11; 150/113, 109, 111

[56] References Cited

U.S. PATENT DOCUMENTS

| 784,559 | 3/1905 | Graham | 383/24 X |
|---|---|---|---|
| 1,374,960 | 4/1921 | Shipman | 383/22 |
| 2,691,400 | 10/1954 | Giordano | 206/315.11 X |
| 2,997,160 | 8/1961 | Marshall, Jr. | 383/37 X |
| 3,143,153 | 8/1964 | Smith | 383/71 |
| 3,275,053 | 9/1966 | Kabana | 150/118 |
| 4,094,351 | 6/1978 | Catenaccio | 383/37 X |
| 4,506,801 | 3/1985 | Origuchi | 206/554 X |

FOREIGN PATENT DOCUMENTS

| 534714 | 10/1958 | Belgium | 150/113 |
|---|---|---|---|
| 0136171 | 4/1985 | European Pat. Off. | 383/22 |
| 2460857 | 3/1981 | France | 206/554 |
| 998967 | 7/1965 | United Kingdom | 383/25 |

Primary Examiner—William Price
Attorney, Agent, or Firm—Laney, Dougherty, Hessin & Beavers

[57] ABSTRACT

A bag assembly that is particularly adapted for fishing tackle stowage consisting of an outer bag and a bag unit connected thereto by tether to allow insertion and removal of the bag unit. The bag unit consists of a plurality of heavy gauge, two-sided, polyfilm bags having reclosable tops and the bottoms are each removably retained on a quick-release holder strap.

7 Claims, 4 Drawing Figures

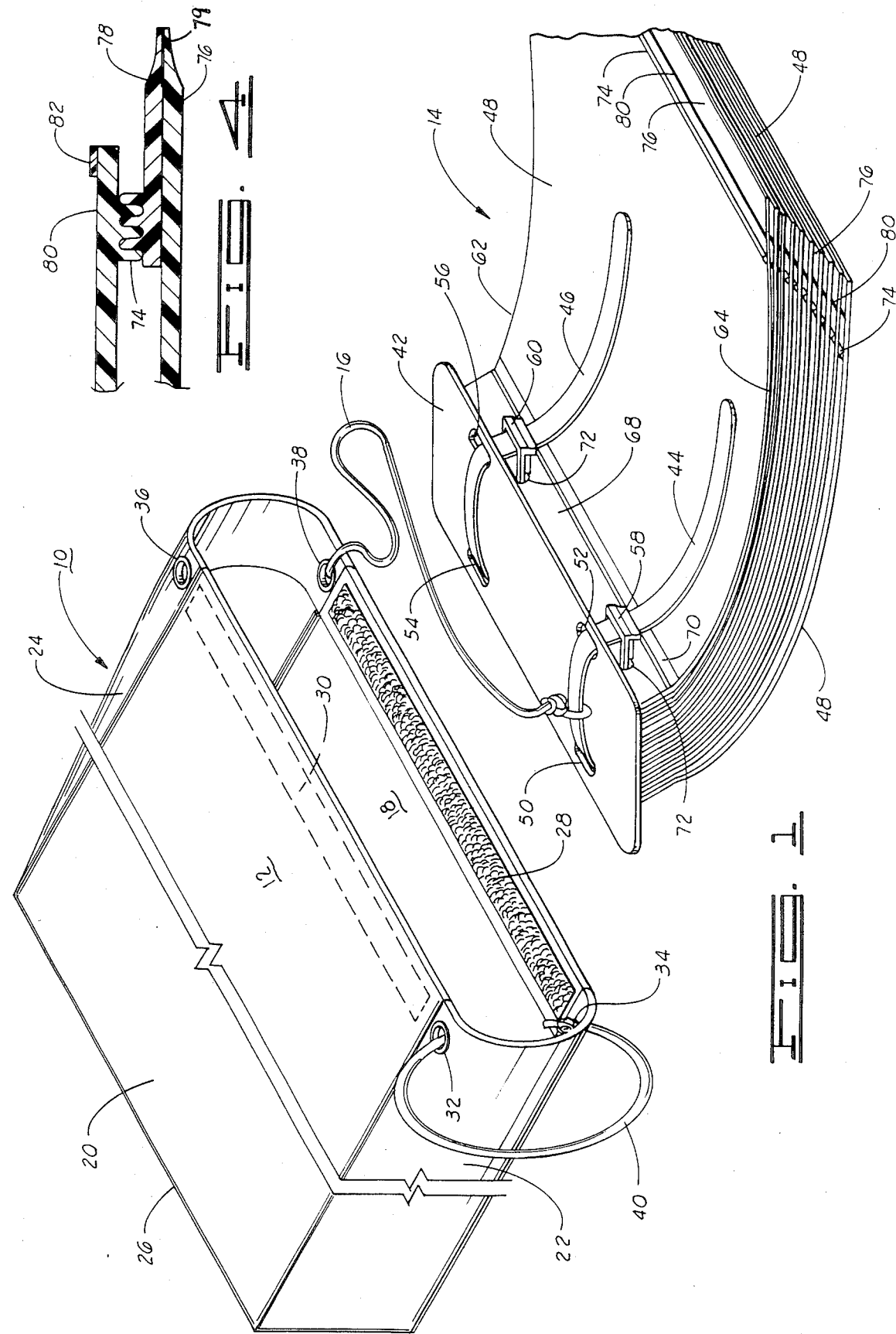

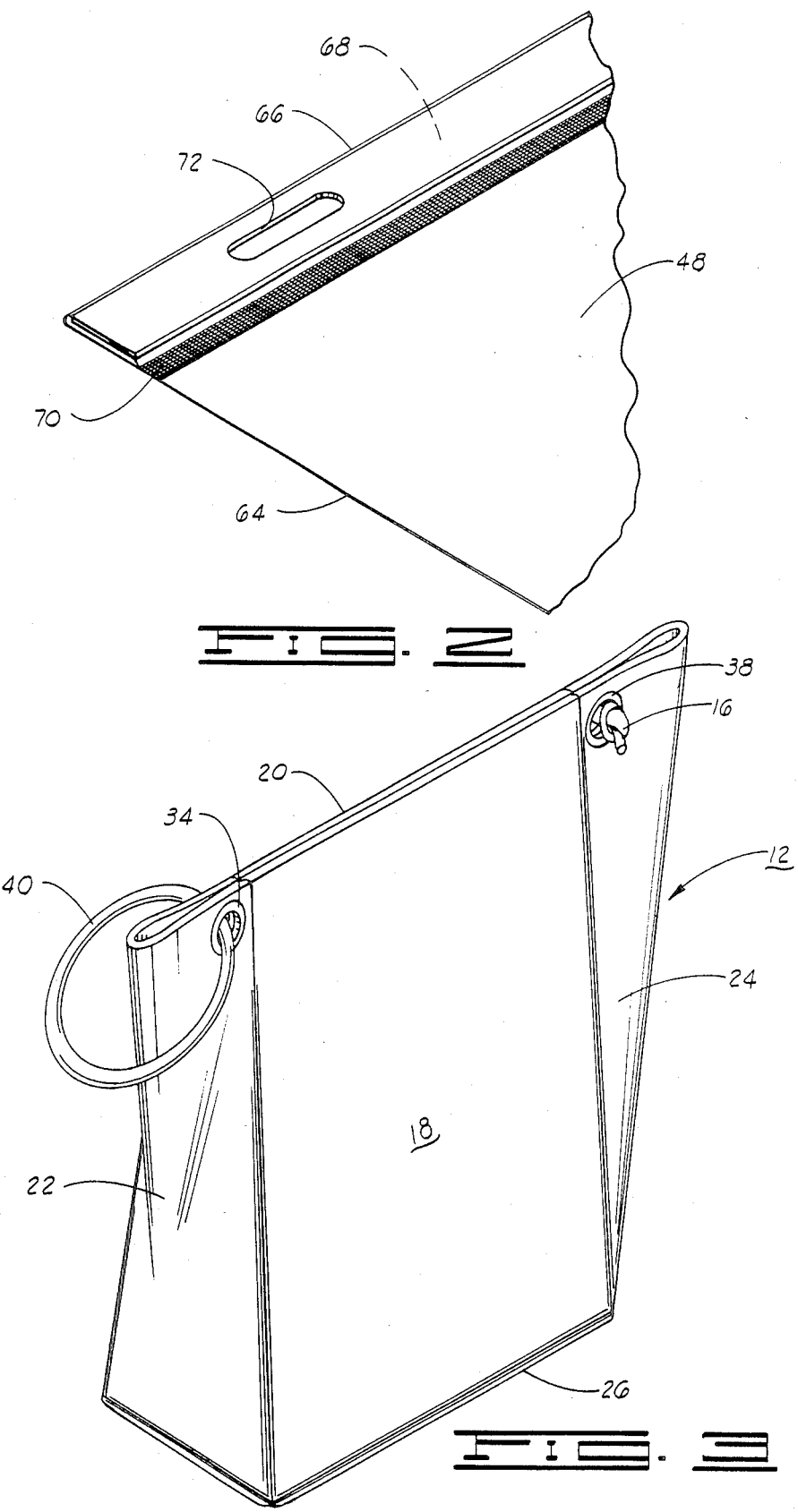

PORTABLE BAG STORAGE ASSEMBLY

BACKGROUND OF THE INVENTION

1. Field of the Invention

The invention relates generally to an outer bag carrying a plurality of bag compartments therein and, more particularly, but not by way of limitation, it relates to an improved construction of such as a compartmented holder for fishing tackle or the like that may be readily carried and handled.

2. Description of the Prior Art

The prior art includes numerous types of fishing tackle containers, usually taking the form of plastic or steel box structures, most types of which are quite old and well-known in the art. In addition, the prior art has seen many approaches to the use of fabrics and films for bagging use including various forms of see through and other diverse forms of bag and box member. No really pertinent prior art has been discovered prior to filing of the present application.

U.S. Pat. No. 4,383,385 is of interest in that it discloses a distinct divergence from the old, tried and true fishing tackle container concepts, namely use of a clear, tubular-shaped device that is adapted to retain a fishing lure, and a plurality of such tubular devices can then be suspended from a retaining ring 28 that may be suspended from the belt or such. U.S. Pat. No. 2,580,912 is of interest in that it too teaches a basic structure in the form of a coverable holster-like holder which again shows departure from the usual approaches in accessible storage of fishing tackle.

SUMMARY OF THE INVENTION

The present invention relates to an improved bag assembly for use in retaining classifiable components, a primary intended use being as a light weight, easily carried fishing tackle holder. The assembly consists of an outer bag structure defining a generally cuboid volume and having a sealable mouth. A plurality of clear, heavy gauge plastic bags with manually re-sealable openings are then retained on a strap card which, in turn, is connected via a tether so that the entire retainer bag assembly can be closed within the outer bag.

Therefore, it is an object of the present invention to provide a container bag that may readily retain a plurality of classifiable articles in compact, efficient manner.

It is also an object of the present invention to provide a fishing tackle holder that is easily carried yet readily accessible at all times.

It is still further an object of the present invention to provide a portable holder for classifiable articles that is light, resistive to battering and abuse, and retentive of aesthetic properties of appearance.

It is still further an object of the present invention to provide a fishing tackle carrier that is resistive to the deleterious effects of water, excessive sun and such.

Finally, it is an object of the present invention to provide a bag assembly with individual bag compartments that may be readily adjusted to conform to the exigencies of a particular usage.

Other objects and advantages of the invention will be evident from the following detailed description when read in conjunction with the accompanying drawings which illustrate the invention.

BRIEF DESCRIPTION OF THE DRAWINGS

FIG. 1 is a perspective view of the bag assembly of the invention in a disassembled, laid-out attitude;

FIG. 2 is a view in perspective of a portion of a bag unit as constructed in accordance with the present invention; and FIG. 3 is a view in perspective of a bag assembly of the present invention in its assembled, closed position; and FIG. 4 is an enlarged view in section of the outer end of an inner bag.

DETAILED DESCRIPTION OF THE INVENTION

Referring to FIG. 1, a bag assembly 10 consists of an outer bag 12 with a bag unit 14 connected by means of a tether 16 for retention that maintains the assembly continually unitary. The tether 16 may be such as a relatively heavy, braided nylon cord or the like that is suitable to provide the tether function. Tether 16 should be long enough to allow removal and relative manipulation of bag unit 14 from outer bag 12.

The outer bag 12 is constructed from tough, yet attractive material that will be generally resistive to external forces to be encountered. For example, in current construction, outer bag 12 is formed from a heavy denier, nylon pack cloth having texture and grade approximate that of canvas. The nylon pack cloth is desirable due to the fact that it can be selected in a variety of colorfast dye lots, but any number of sailcloth, canvas or other such fabrics may be utilized in construction of outer bag 12. Outer bag 12 is constructed to be generally cuboid in form with stitched construction making up opposite side panels 18 and 20, opposite end panels 22 and 24 of narrower dimension, and a bottom panel 26. See also FIG. 3 which illustrates outer bag 12 in its closed attitude.

The upper portions of side panels 18 and 20 each include a respective Velcro strip 28 and 30 as stitched along the upper, inside edge. Velcro strips 28 and 30 are a mating engagement material which may be pressed together to provide a firm enclosure of the top portion of outer bag 12, as shown in FIG. 3. Outer bag 12 is also fitted with opposite side press-fit eyelets 32, 34 and 36, 38. Thus, on one side the eyelets 32 and 34 can be used to secure a handle cord 40 as retained by knotted insertion through respective eyelets 32 and 34. On the other side, the tether cord 16 may be secured as by knotted insertion through such as eyelet 38. Actually, the tether 16 and handle loop 40 may be attached variously as desired and may, in fact, be a unitary cord providing both functions.

The bag unit 14 consists of a stack holder card 42 connected by a pair of releasable straps 44, 46 to retain a plurality of individual bags 48. The holder card 42 may be constructed of a generally rigid card constructed of plastic or other weatherresistant material and sized for ready insertion into outer bag 12. Proximate opposite sides of holder card 42 are disposed respective pairs of slots 50, 52 and 54, 56 for receiving respective straps 44 and 46.

The straps 44 and 46 are each comprised of flexible quickconnect straps, constructed of plastic in the present design which attach through respective sides of holder card 42 and support a plurality of individual retainer bags 48. In present design, the straps 44 and 46 are a commercially available form of cable strap, type TCA12, that is commercially available from TYTON Corporation in Milwaukee, Wis. The individual straps 44, 46 have respective quick-release buckles 58, 60 integrally formed therewith, and these can be easily manipulated to remove or add additional bags 48.

As shown in FIG. 2, each of the bags 48 is specially constructed to provide the requisite ruggedness and reliability as the bag unit 14 undergoes repeated insertion and removal from the outer bag 12. Each of the bags 48 consists of a polyester film bag constructed with two-plys and being heat sealed along each edge 62 and 64 as well as along the bottom 66. A reinforcing or stiffener strip 68 is inserted along the bottom of each bag 48 and then a transverse heat weld 70 is applied to maintain the stiffener strip 68 in position. A pair of spaced slots 72 are then punched through both polyester plys and strip 68 to provide a hole for receiving the respective straps 44 and 46.

The bags 48 are similar to polyfilm bags that are commercially available for use in food packaging and the like except that bags 48 of the invention are formed from 0.006 inch thickness polyfilm to provide increased durability. Bags 48 are each reclosable by a conventional type of bead closure 74 (see FIG. 1). As shown in FIG. 4, each ply or side of bag 48 includes a tri-ridge stripe formed on the surface transversely, and the stripes face each other in offset relationship so that they can be intermeshed easily by finger pressure to retain a tight sealing affixture. In each bag 48, a first side 76, with strip 78 heat welded as at 79, is allowed to extend further than the opposite or second side 80, and second side 80 is marked with a contrasting color line 82 along its edge to enable easy opening thumb/finger manipulation. The opposed tri-ridge stripes are formed on each of inner strip 78 and ply 80 coactive relationships. It should be understood also that the FIG. 4 sealing mechanism illustrates but one type of quick-seal or bead closure design that may be utilized with respect to the individual bags 48 of the invention.

In operation, each bag unit 14 consists of a plurality of bags 48, twelve bags 48 has been found to be a number providing good fishing tackle capability, but a lesser or greater number can always be fastened into the bag unit 14. In fishing tackle application, each individual bag 48 is selected to hold certain baits, hook combinations, snell combinations, leaders, weights, plastic worms and whatever the angler's desired paraphernalia. The 6 mil polyfilm material of bags 48 is sufficiently heavy that unless a hook or sharp object is forcefully urged through the film, the bags tend to safely house all hooks and barbs without breakthrough. As the bag unit 14 is fully loaded with the requisite fishing gear, the entire bag unit 14 can be inserted into outer bag 12 with subsequent sealing of the top by means of Velcro strips 28–30. The bag assembly 10 can then be toted or retained on a belt hanger by means or cord loop 40 to constitute a lightweight and accessible gear holder that can be stowed out of the angler's sphere of activity.

The foregoing discloses a novel bag assembly which can find application not only as a fishing tackle retainer, but also retention of any of a number of different classifiable objects or items. The bag assembly constructed in accordance with the present invention provides not only lightweight, reliable stowage of selected items, but also relatively air or water-tight enclosure, and such an accessory bag may be utilized in diverse applications to good advantage.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A bag assembly for storage of classifiable objects, comprising:
    an outer bag formed of resilient material and having sides and bottom that define a selected volume;
    a plurality of generally transparent plastic bags having opposite sides, bottom and top with the top being formed with a reclosable fastener means;
    retainer means securing the bottom of each of said plurality of plastic bags; and
    tether means connecting said retainer means to said outer bag to allow insertion and removal of said plurality of plastic bags relative to said outer bag.

2. A bag assembly as set forth in claim 1 wherein each of said plastic bags further comprises:
    stiffener means secured across the bottom of said plastic bags and including at least one hole for receiving said retainer means therethrough.

3. A bag assembly as set forth in claim 1 wherein said retainer means comprises:
    holder means; and
    first and second quick-release strap means secured through said holder means and said plurality of plastic bags in spaced relationship.

4. A bag assembly as set forth in claim 3 wherein each of said plastic bags further comprises:
    stiffener means secured across the bottom of said plastic bag and including first and second holes for receiving said first and second strap means therethrough.

5. A bag assembly as set forth in claim 2 wherein each of said plastic bag reclosable fastener means comprises:
    first bead means formed across the inner side of the first side of said plastic bag; and
    second bead means formed across the inner side of the second side of said plastic bag in an aligned and offset relationship to said first bead means;
    whereby manual pressure may be applied to securely interlock said first and second bead means to effect bag closure.

6. A bag assembly as set forth in claim 5 wherein:
    each of said plastic bags is formed from a polyester film that is at least four mils thickness.

7. A bag assembly as set forth in claim 3 wherein said stiffener means comprises:
    a plastic strip disposed to extend across the bottom of the respective plastic bag to be heat sealed in position and to receive first and second spaced holes in order to receive said first and second quick-release strap means therethrough.

* * * * *